(12) United States Patent
Chen (10) Patent No.: US 9,480,129 B2
(45) Date of Patent: Oct. 25, 2016

(54) SECURITY LIGHT WITH LIFESTYLE SOLUTIONS (71) Applicant: Chia-Teh Chen, Taipei (TW)

(72) Inventor: Chia-Teh Chen, Taipei (TW)

( * ) Notice: Subject to any disclaimer, the term of this patent is extended or adjusted under 35 U.S.C. 154(b) by 0 days.

(21) Appl. No.: 15/131,448

(22) Filed: Apr. 18, 2016

(65) Prior Publication Data

US 2016/0234914 A1    Aug. 11, 2016

Related U.S. Application Data (63) Continuation of application No. 13/974,455, filed on Aug. 23, 2013, now Pat. No. 9,351,373.

(51) Int. Cl.
*H05B 37/02*    (2006.01)

(52) U.S. Cl.
CPC ...... *H05B 37/0218* (2013.01); *H05B 37/0227* (2013.01); *H05B 37/0272* (2013.01); *H05B 37/0281* (2013.01)

(58) Field of Classification Search
CPC .............. H05B 37/02; H05B 37/0218; H05B 37/0227; H05B 37/0281; H05B 33/08; H05B 33/0833
USPC .................. 315/149, 151–159, 291, 307, 308
See application file for complete search history.

(56) References Cited

U.S. PATENT DOCUMENTS

| | | | |
|---|---|---|---|
| 5,442,177 A | 8/1995 | Boulos et al. | |
| 5,598,066 A | 1/1997 | Wiesemann et al. | |
| 5,747,937 A | 5/1998 | Wiesemann et al. | |
| 6,225,748 B1 | 5/2001 | Evans et al. | |
| 6,820,998 B2 | 11/2004 | Chen | |
| 6,925,741 B2 | 8/2005 | Eloo et al. | |
| 7,122,976 B1 | 10/2006 | Null et al. | |
| 7,268,497 B2 | 9/2007 | Hsieh | |
| 7,271,543 B1 | 9/2007 | Goldstein | |
| 7,339,471 B1 | 3/2008 | Chan et al. | |
| 7,405,524 B2 | 7/2008 | Null et al. | |
| 7,592,913 B2 | 9/2009 | Hsieh | |
| 7,880,394 B2 | 2/2011 | Sibalich et al. | |
| 8,035,513 B2 | 10/2011 | Raper | |
| 8,755,039 B2 | 6/2014 | Ramer et al. | |
| 2009/0278479 A1* | 11/2009 | Platner | H05B 37/0245 315/312 |

* cited by examiner

*Primary Examiner* — Jimmy Vu
(74) *Attorney, Agent, or Firm* — Li & Cai Intellectual Property (USA) Office (57) ABSTRACT

A lifestyle lighting solution using microcontroller technology for controlling nighttime illumination is disclosed wherein the night time illumination is divided into two stages with the first stage being a high power illumination for a preset time period and the second stage being an energy saving/security illumination. The time period of the first stage high power illumination is managed by a virtual timer which is programmable and dynamically variable according to the home owners' living habits and needs. The second stage energy saving illumination with four options is produced by different combinations of dimming techniques and motion sensor. The lifestyle illumination also using microcontroller technology to replace the function of photo cell enables the users to manage their time table of home lighting performance for both indoor and outdoor application. The present invention provides home owners possibility to choose among different working modes integrated in a single lighting device.

24 Claims, 7 Drawing Sheets

SECURITY LIGHT WITH LIFESTYLE SOLUTIONS

CROSS-REFERENCE TO RELATED APPLICATIONS

This Application is a continuation application of prior application Ser. No. 13/974,445 filed on Aug. 23, 2013, currently pending, the entire contents of which are incorporated herein by reference.

BACKGROUND OF THE INVENTION

1. Field of the Invention

The present invention relates to a management technology for operating lighting devices; in particular to some humanized techniques to perform a programmable delay time management and the application thereof.

2. Description of Related Art

The use of motion sensor to enable a lamp to perform a transient illumination is a well-known technology. Generally, there are two purposes for the need of a transient illumination by using a motion sensor. The first purpose is for energy saving wherein the light source is enabled only when the user enters the detection zone. The second purpose is for threatening intruders by using an instant extreme variation of luminance to achieve the objective of security guard. The drawback of the lighting device with the above-mentioned motion sensor is that the lighting device would keep in inactivated state and the environment would be dark when user is not in the detection range of the motion sensor. User is therefore not able to recognize the direction or the location of destination. In order to overcome the above-mentioned drawbacks, a lighting device with a motion sensor to perform two-level lighting was invented in U.S. Pat. No. 5,747,937 which enables a lamp to perform a low level illumination at nightfall and when a person or an animal enters the sensing range of the motion sensor the lamp is instantly activated to perform a high level illumination. Thus, when the user is outside the detection range, he or she can still see the ambient low level illumination to get a sense of direction or location of destination. Furthermore, a two-level security lighting device providing a timed illumination was invented in U.S. Pat. No. 7,339,471 B1 which enables a lamp at the onset of nightfall to perform an accent illumination for a time period and the lamp is illuminated at increased brightness when activated by a motion sensor, wherein the time length of the accent illumination can be automatically adjusted for different nighttimes due to seasonal effect when the lighting device is operated under a solar tracking mode.

The aforementioned two-level security lighting devices are a compromised solution between illumination need and security function throughout the night time. As a matter of fact and from the perspective of lifestyle living, the two-level security lamps in U.S. Pat. Nos. 5,747,937 and 7,339,471 B1 have ignored the different needs of illumination versus security function along the time frame during the night period. In early evening the general illumination is more needed than the security function, while in late evening the security function is more needed than the general illumination. The present invention is designed to offer an improvement over the drawback of the aforementioned two-level solutions, such that the lamp works as a general flood light with full illumination capacity for a preset time period in early evening when people are active before it is converted to a motion sensor activated security lighting in late evening when people are ready to go sleeping. Such hybrid configuration offers many choices of lifestyle lightings which optimizes the functional utilization of a lighting device for both general illumination and security guard during the course of nighttime period. This life style lighting solution would become even more meaningful with the increasing popularity of the LED bulbs which consumes very low energy at full-power illumination in early evening time and also serves perfectly as a security light to warn intruders in late evening time. Consumers will be pleased to see their outdoor space fully illuminated at low energy cost in the early evening time while enjoy or show off the beautiful and romantic scenery of their houses and landscapes. It is rather interesting to compare the present invention with LED bulbs to the two-level halogen security lamp per U.S. Pat. No. 5,747,937 which when operating at low level still consumes as much as 35 watts to 40 watts while our present invention consumes only 10 watts to 15 watts even at full-power illumination for the time period of early evening.

SUMMARY OF THE INVENTION

The objective of the present invention is to provide house owners a lifestyle lighting solution catering to their living habits. In the present invention a lighting device is provided, wherein the nighttime illumination of the lighting device is divided into two stages, with the first stage being a full-power illumination and the second stage being a power-saving/security illumination. The time point that the lighting device is changed from a full-power illumination to a power-saving illumination is the conversion time point, and such a conversion time point is creatively and uniquely designed to be programmable by the users according to their living needs. The technology also offers selection of different time periods for performing the full-power illumination before the lighting device being converted to the power-saving/security illumination.

In order to achieve the aforementioned objective, according to an embodiment of the present invention, a lighting device is provided which has two working modes selectable by the user, wherein the first working mode is a dusk-dawn mode, in which the lighting device is automatically turned on at dusk with a full-power illumination, and the same high level illumination continues until the lighting device is automatically turned off at dawn; wherein the second working mode is a lifestyle mode, in which the lighting device is automatically turned on at dusk to perform a full-power illumination for a preset time period and at a conversion time point the lighting device is switched from the full-power illumination to perform a power-saving illumination until daybreak. The time length of the preset time period is dependent on the conversion time point which is variable or programmable by appropriate means according to the user's need.

According to an embodiment of the present invention, a lighting device is constructed at least with a photo sensor, a motion sensor and a microcontroller such that the lighting device is automatically turned on at dusk and turned off at dawn by the photo sensor, wherein during the course of nighttime the lighting device performs two stages of illumination controlled by the microcontroller in such a manner that a timer embedded in the microcontroller is configured to set a conversion time point and to control a full-power illumination or high power illumination for a desired preset time period before being converted to a power-saving and security illumination in response to the motion sensor.

The present invention discloses a lifestyle lighting solution by configuring a timer in the microcontroller with at least three methods to set the conversion time point, which are:

(1) the anytime setting, in which the user selects a conversion time point for the lighting device by giving a trigger signal to the microcontroller, wherein the microcontroller recognizes the trigger signal and reacts at the moment of the selected time point by promptly converting the light performance from the full-power illumination to a power-saving or security illumination, and at the same time stores this selected time point in its memory for repetitive performance at this selected conversion time point on a daily basis until another trigger signal being given by the user to change the timer configuration;

(2) the fixed time point setting, in which the timer of the microcontroller is programmed to be capable of tracing the nighttime shift due to seasonal effect wherein the timer of the microcontroller dynamically controls the duration of the full-power illumination so that the lighting device can switch by itself at a fixed time point from the full-power illumination to a power-saving or security illumination;

(3) the fixed time period setting, in which the timer has a fixed time count so that the lighting device illuminates with full power for a constant time period before being converted to a power-saving or security illumination.

When the timer is configured by the fixed time point setting, the microcontroller with its program codes performs an automatic time shift detection to measure the seasonal time shift of dusk and dawn so as to dynamically adjust the time length of the preset time period for performing full-power illumination. Consequently, when the timer is configured to be compliant with seasonal time shift, the conversion time point is fixed to counteract the seasonal daytime variation. The advantage of the present invention is obvious. For instance, if in autumn season with sunset at 6 p.m., a house owner selects a three-hour period for performing a full-power illumination in early evening, the lighting device will be converted to a power-saving or security illumination year round at 9 a.m. which is a fixed conversion time point without being affected by the seasonal time shift of dusk and dawn. In the absence of such an automatic capability to detect seasonal time shift and when in winter season, the lighting device will be automatically turned on at around 4:30 p.m. (sunset time) and then be converted to a power-saving illumination at 7:30 p.m. which is too early according to our living habit. This automatic adjustment of the time period in performing full-power illumination also works well in extreme places like Greenland or Iceland.

The present invention discloses a security lighting device which provides at least the following variations to perform the second stage or security illumination after the conversion time point, which are:

(1) Complete cutoff; the lighting device is turned off completely at the conversion time point through the rest of nighttime and at dawn the lighting device is reset to enter a new cycle of repetitive performance. Thus, at dusk the lighting device is again turned on automatically to perform a full-power illumination for a preset time period and at the same conversion time point is again turned off completely accordingly.

(2) Low level illumination; the lighting device is switched to a low level illumination throughout the rest of nighttime. At dawn the lighting device is turned off and reset to enter a new cycle of repetitive performance. Thus, at dusk the lighting device is again automatically turned on to perform a full-power illumination and continues until reaching the same conversion time point at which the lighting device is switched to a low level illumination accordingly.

(3) Complete cutoff coupled with motion sensor activated illumination; the lighting device is switched to complete cutoff at the conversion time point and at the same time enters a standby status to await the detection signal from the motion sensor. When a body motion is detected, the motion sensor activates the lighting device to perform a full-power illumination only for a short time period until the motion detection signal disappears. At dawn the lighting device is reset to enter a new cycle of repetitive performance. Thus, at dusk the lighting device is automatically turned on and continues until reaching the conversion time point at which the lighting device is switched to complete cutoff and enters a standby status to await the detection signal from the motion sensor accordingly.

(4) Low level illumination coupled with motion sensor activated illumination; at the conversion time point the lighting device is switched to a low level illumination and at the same time enters a standby status to await the detection signal from the motion sensor. Whenever a body motion is detected, the motion sensor activates the lighting device to perform a full-power illumination only for a short time period until the motion detection signal disappears. At dawn the lighting device is reset to enter a new cycle of repetitive performance. Thus, at dusk the lighting device is automatically turned on for a full-power illumination and continues until reaching the conversion time point at which the lighting device is switched to a low level illumination and enters a standby status to await the detection signal from the motion sensor accordingly.

To make the lighting device of the present invention even more user friendly, the present invention also provides home owners additional solution of being able to choose different working modes designed in at different time or on different occasions. For example, in a multi-mode lighting device wherein two or three working modes are built into one single lighting device using the microcontroller technology, the user can select one of the multi-modes for performance by using a control signal to alternately change the working mode or using control signals of different format and different binary patterns to activate corresponding working modes. The multi-modes always includes a basic dusk-dawn mode and the above mentioned lifestyle security modes for user's selection and the high power illumination mode.

The present invention further provides a lighting device constructed with a motion sensor and a microcontroller such that instead of using a photo sensor the lighting device is automatically turned on at dusk and turned off at dawn by the program codes of the microcontroller, wherein during the course of nighttime the lighting device has at least two working modes selectable by the users. In order to perform the aforementioned lifestyle mode without using photo sensor, the user takes an initial setting process to input at least three time parameters to the microcontroller, namely a first preset time point to turn on the lighting device for a full-power illumination, a second preset time point to convert to power-saving/security illumination which being coupled with the motion sensor and a third preset time point to turn off the lighting device and at the same time to reset the microcontroller for the next 24 hours performance cycle. Such lifestyle mode without reliance on a photo sensor enables the users to manage their time table of lighting performance for both indoor and outdoor applications.

The light sources of the present invention can be incandescent lamps, fluorescent lamps, AC LED modules or DC LED bulbs. According to the embodiments of the present invention, the two-level illumination performance can be achieved either by dimming a single light source load or by using a double-load construction with a low-wattage and a high-wattage light source load such that the high-wattage light source load is always activated by the motion sensor and the low-wattage light source load is automatically turned on and off with or without the photo sensor. The lighting device with lifestyle illumination management is therefore different from the dusk to dawn lighting devices and the traditional motion sensor activated security lighting apparatuses. The present invention offers a versatile solution to users to manage their night illumination according to their life styles and living habits.

To sum up, the lighting device with programmable timer technology to dynamically control full-power illumination and power-saving illumination provided in an embodiment of the present invention integrates multi luminance functions into one single construction without resorting to complex hardware, wherein design concept with humanized considerations is adopted.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
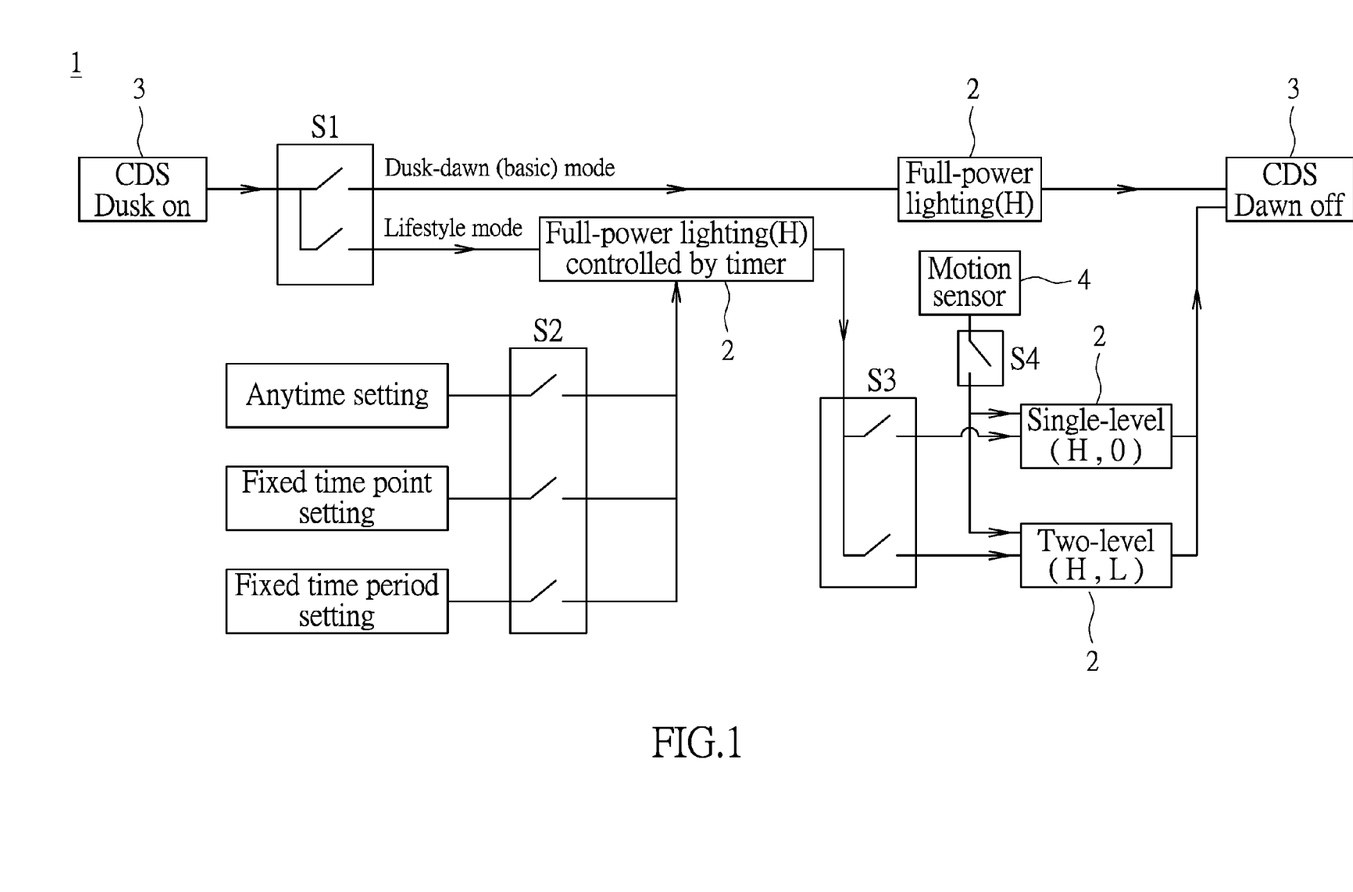
FIG. 1 schematically shows a block diagram depicting the operation principle of the lifestyle lighting device according to various embodiments of the present invention.

FIG. 1 shows a block diagram depicting the operation principle of a lifestyle lighting device according to various embodiments of the present invention. Referring to FIG. 1, a lighting device 1 of the present invention is composed basically of a controller unit 2, functional selection switches S1-S4 and sensor elements 3, 4, together with light source loads and electric power unit not depicted here. As a basic operation, a lighting device 1 is enabled at dusk and disabled at dawn by using a photo sensor (CDS) 3 to detect daylight and to control electric power supply to the lighting device 1. This basic operation is referred to as dusk-dawn mode. According to FIG. 1, the lighting device 1 includes a dusk-dawn mode and a lifestyle mode, wherein a mode selection switch S1 is provided in the lighting device 1 to choose different operation mode.

When operating S1 to select the dusk-dawn mode, the lighting device 1 is turned on automatically at dusk to perform a full-power illumination or high power illumination controlled by the controller unit 2, and the same high level illumination continues until the lighting device 1 is automatically turned off at dawn, and the lighting device 1 is reset to enter a new operation cycle on a daily basis; by operating S1 to select the lifestyle mode, the lighting device 1 is turned on automatically at dusk to perform a full-power illumination for a preset time period until reaching a conversion time point, at which the lighting device 1 is converted to a power-saving or security illumination controlled by the controller unit 2, and the security illumination continues until the lighting device 1 is automatically turned off at dawn, and the lighting device 1 is reset to enter a new operation cycle on a daily basis.

The lifestyle mode is characterized by a full-power illumination lasting for a preset time period which is measured between the turn-on time point of the lighting device at dusk and the conversion time point controlled by a virtual timer in the controller unit 2. Referring to FIG. 1, a functional switch S2 is provided in the lighting device 1 in order to set the conversion time point or the preset time period by at least three methods, which are: (1) the anytime setting, for selecting an arbitrary conversion time point by the user; (2) the fixed time point setting, for enabling the lighting device 1 to have a conversion time point without being affected by seasonal effect; and (3) the fixed time period setting, for selecting a constant time period. More details regarding each setting method will be described later with the help of circuit diagrams. In short, the illumination performance of the lifestyle lighting device 1 during the course of nighttime is divided by a conversion time point into two stages, with the first stage being a full-power illumination and the second stage being a power-saving or security illumination controlled by the controller unit 2. The conversion time point which is dynamically variable or programmable according to the user's demand is the key technology for the lifestyle lighting solutions.

The lighting device 1 furthermore provides four options for the second stage power-saving or security illumination in order to extend its utility. As depicted in FIG. 1, a functional switch S3 is introduced for this purpose. The lighting device 1 can perform at the second stage with one of the two illumination types selectable by operating a functional switch S3, which are:

(1) Complete cutoff (0), wherein at the conversion time point the lighting device 1 is turned off completely through the rest of nighttime. At dawn, the lighting device 1 is reset to enter a new cycle of repetitive performance;

(2) Low level illumination (L), wherein at the conversion time point the lighting device 1 is switched to perform a low level illumination, generally at 30% or less of the full-power illumination. The low level illumination continues through the rest of nighttime. At dawn, the lighting device 1 is reset to enter a new cycle of repetitive performance.

Moreover, referring to FIG. 1, a functional switch S4 is connected to a motion sensor 4. When the switch S4 is short-circuited, the motion sensor 4 is coupled to the controller unit 2 and the lighting device 1 can perform at the second stage with one of the other two illumination types selectable by operating the switch S3 as depicted in FIG. 1, which are:

(3) Complete cutoff coupled with motion sensor activated illumination (H,0), wherein the lighting device 1 is turned off completely at the conversion time point and at the same time enters a standby status to await the detection signal from the motion sensor 4. When a body motion is detected, the lighting device 1 reacts by changing its illumination from off-state (0) to a full-power illumination (H) for a short time period and then returns to the standby status with a complete off state. This illumination type is also referred to as a motion sensor activated single-level illumination which continues until dawn. At dawn, the lighting device 1 is reset to enter a new cycle of repetitive performance;

(4) Low level coupled with motion sensor activated illumination (H,L), wherein at the conversion time point the lighting device 1 is switched to perform a low level illumination, generally at 30% or less of the full-power illumination, and at the same time enters a standby status to await the detection signal from the motion sensor 4. When a body motion is detected, the lighting device 1 reacts by changing its performance from a low level illumination (L) to a full-power illumination (H) for a short time period and then returns to the standby status with a low level illumination. This illumination type is also referred to as a motion sensor activated two-level illumination which continues until dawn. At dawn, the lighting device 1 is reset to enter a new cycle of repetitive performance.

Based on the operation principle depicted in FIG. 1, the lighting device 1 of the present invention has three variations in time period setting for performing the full-power illumination and four variations in illumination types of the power-saving or security illumination. The lighting device 1 offers therefore twelve different combinations of lifestyle lighting solutions or lifestyle lighting management for indoor and outdoor applications. It provides flexibility for designing lifestyle solutions by combining an appropriate numbers of the aforementioned variations into a lighting device. For instance, a lighting device can be so constructed without a photo sensor such that it is turned on manually by operating a wall switch, performs at the first stage a full-power illumination for a fixed time period and then at the second stage a motion sensor activated single-level illumination.

Referring to FIG. 1, according to various embodiments of the present invention, the operation of the lighting device 1 is automatically conducted by the controller unit 2 in response to the sensor elements 3,4 to perform a lifestyle illumination which is divided into two stages during the course of entire nighttime. The controller unit 2 is responsible for a lifestyle solution wherein parameters for different timed illuminations are preset and programmed through the functional selection switches S1-S4 which are also referred to as external control units or external control means. In practice, the controller unit 2 has an internal timer circuit to perform different timed illuminations. The external control units S1-S4 can be constructed in form of electronic or mechanical means to generate external control signals to perform function selection or timer setting for the controller unit's operation, wherein the external control signals can be in form of constant voltage or a binary voltage signal with a low and a high voltage recognizable by the controller unit 2 to change the working mode or to activate corresponding timer circuit setting.

Figure 2:
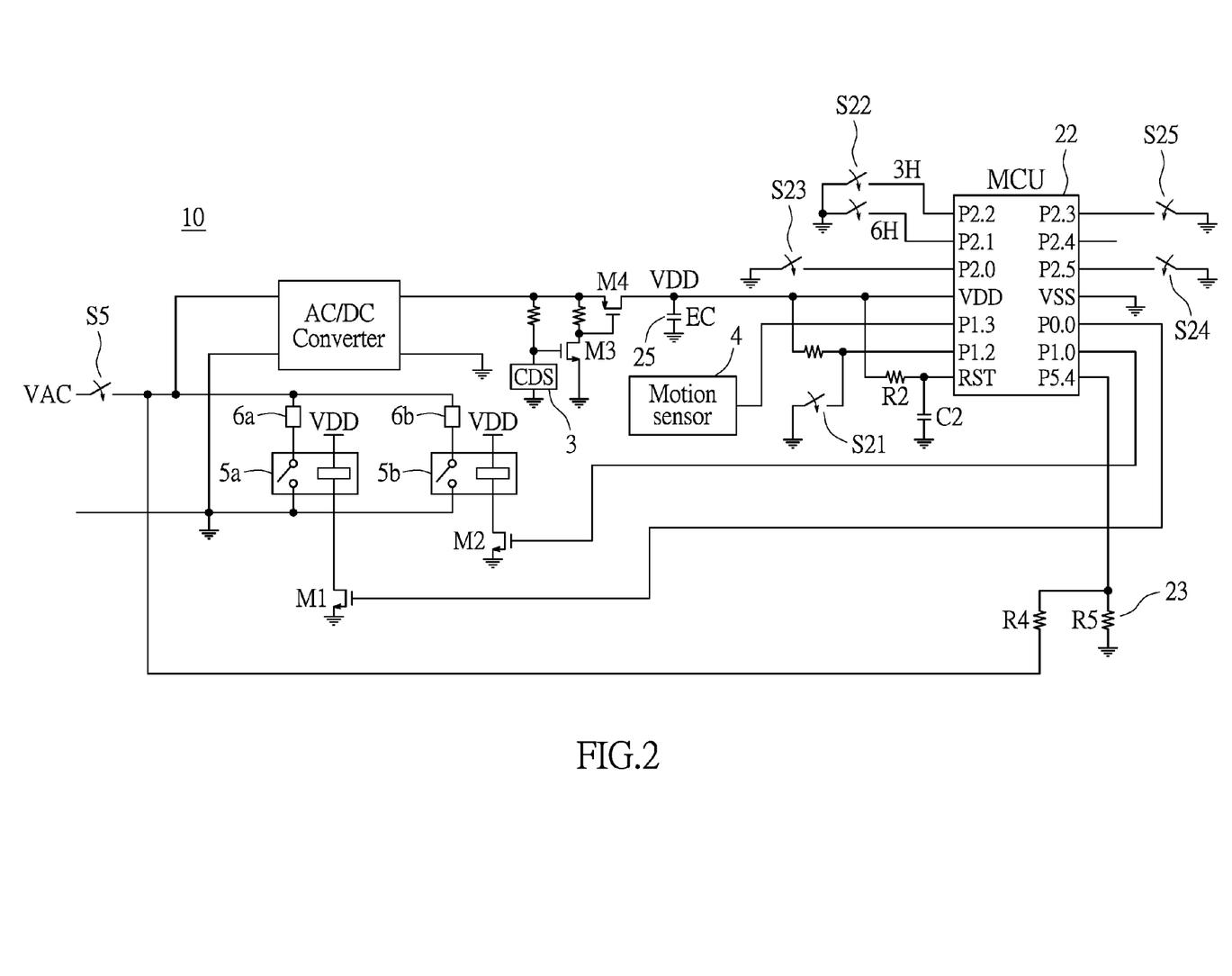
FIG. 2 schematically shows a circuit diagram depicting the lighting device to perform lifestyle lighting by controlling relays to transmit electric power to two light source loads according to an embodiment of the present invention.

Referring to FIG. 1 and FIG. 2, FIG. 2 shows schematically a circuit diagram for technically implementing a lighting device 1 according to FIG. 1 of an embodiment of the present invention. In FIG. 2, a conventional AC/DC converter generates a DC voltage VDD as the working voltage for the lighting device 10. A photo sensor CDS 3 is provided to detect daylight and to control the supply of VDD to the lighting device 10. In the daytime, because the photo sensor 3 has a small resistance, the NMOS transistor M3 is turned off and simultaneously the PMOS transistor M4 is turned off completely to prohibit supplying VDD to the lighting device 10. In the nighttime, because the photo sensor 3 has a large resistance, the NMOS transistor M3 is turned on and simultaneously the PMOS transistor M4 is turned on heavily to supply VDD to the lighting device 10. Therefore, the lighting device 10 is automatically enabled at dusk and disabled at dawn by the photo sensor 3. At dusk the lighting devices 10 begins to work. Referring to FIG. 2, the lighting device 10 has a microcontroller 22 as the controller unit 2 to control the electric conduction state of the relay modules 5a, 5b for transmitting electric power to the light source loads 6a, 6b, respectively. The microcontroller 22 incorporating with a photo sensor 3 and a motion sensor 4 controls the illumination of the light source loads 6a, 6b to perform one of two working modes, which are dusk-dawn mode and lifestyle mode. In the lifestyle mode the microcontroller 22 performs illumination divided into two stages according to proper settings of a delay timer in the microcontroller.

In the following, the description is referred to the lighting device 10 being enabled by the photo sensor 3 through the entire nighttime. Referring to FIG. 2, the microcontroller 22 has the connection pins P0.0-P5.4 as input and output ports respectively to receive external control signals from the external control means S21-S25 and to deliver control voltages to a controllable switching unit consisting of the relay modules 5a, 5b to transmit electric power to the light source loads 6a, 6b.

Refer to FIG. 1 and FIG. 2. In FIG. 2, the working mode selection is done by operating the external control means S21 which, for instance, is a toggle switch with one end connected to the ground and with another end via a resistor connected to VDD and also connected directly with the pin P1.2 of the microcontroller 22. By short-circuiting S21 a zero voltage signal appears at P1.2, otherwise the pin P1.2 is held at a high voltage. The microcontroller 22 with its program codes scans constantly the electric potential at P1.2 for working mode decision. If a zero voltage is detected at P1.2, for instance, it is interpreted by the microcontroller 22 as an external control signal for dusk-dawn mode. The microcontroller 22 runs in response to the external control signal a subprogram to execute the dusk-dawn mode. At the dusk-dawn mode, the microcontroller 22 delivers automatically at nightfall through its two pins P0.0 and P1.0 a high voltage to turn on the NMOS transistors M1 and M2, wherein the two relay modules 5a,5b are short-circuited to transmit electric power to the two light source load 6a,6b such as to perform a full-power illumination; the full-power illumination is sustained by a high voltage at the pins P0.0 and P1.0 until daybreak when the working voltage VDD is cutoff by the photo sensor 3, wherein the microcontroller 22 is reset to enter a next operating cycle on a daily basis. The pin RST connected with resistor/capacitor R2/C2 is reserved for power reset when the microcontroller 22 starts its program on next day.

Referring to FIG. 2, the microcontroller 22 with its program codes scans the electric potential at P1.2 for working mode decision. If a high voltage is detected at P1.2, for instance, it is interpreted by the microcontroller as an external control signal for lifestyle mode. The microcontroller runs in response to the external control signal a subprogram to execute the lifestyle mode. In the lifestyle mode, the microcontroller 22 delivers automatically at nightfall through its two pins P0.0 and P1.0 a high voltage to turn on the transistors M1 and M2 and also simultaneously the two relay modules 5a,5b, wherein the two light source load 6a,6b are turned on to deliver a full-power illumination; the high voltage at the pins P0.0 and P1.0 is sustained for a preset time period controlled by a timer embedded in the microcontroller 22 until reaching a conversion time point, at which the microcontroller 22 with the pin P1.0 remaining at a high voltage, for instance, delivers however a zero voltage to the pin P0.0 to turn off the NMOS transistor M1 and hence also to turn off the corresponding light source load 6a, such that the lighting device 10 has its luminance changed from a full-power intensity to a lower power intensity which is referred as a power-saving illumination; the power-saving illumination continues until daybreak when the working voltage VDD is cutoff by the photo sensor 3, wherein the microcontroller 22 is reset to enter next operating cycle.

As mentioned previously, the lighting device with lifestyle solutions is characterized by a proper conversion time point or a proper preset time period for performing full-power illumination catering to user's living habits. Referring to FIG. 2, the microcontroller 22 has pins reserved for connecting with the external control means S22,S23 and 23 to receive external control signals or trigger signals for selecting method to set the conversion time point or the time period for performing full-power illumination, wherein the setting is made through configuring a virtual timer which is based on executing a long delay time subroutine of the microcontroller program codes or by using auxiliary counter for long time counting. For the lifestyle mode, the timer in the microcontroller 22 can be configured by at least three methods which are:

(1) the anytime setting,
(2) the fixed time point setting, and
(3) the fixed time period setting.

The anytime setting can be done, for instance, in a convenient way by manually operating a wall switch or a main power switch at any clock time when the user wants to choose a desired conversion time point, for instance, going to sleep. Referring to FIG. 2, a main power switch S5 connected between the lighting device 10 and an AC power VAC is used to do the anytime setting. To detect the anytime setting, a sampling circuit 23 consisting of resistors R4 and R5 is connected with one AC power line, wherein the sampling output is connected to a pin P5.4 of the microcontroller 22. When the AC power is shut down by operating the main switch S5, a zero voltage appears at the sampling circuit 23 and hence also at the pin P5.4. In FIG. 2, a large capacitor EC 25 is provided to hold VDD voltage for keeping the microcontroller 22 still in operation when the AC power is turned off momentarily. The anytime setting is accomplished when the user turns off momentarily and within a preset instant time interval, for instance, 1-2 seconds, turns back on the power switch S5 at a selected time point. If the microcontroller 22 with program codes scans constantly the electric potential at pins and detects at the pin P5.4 momentarily a zero voltage caused by this electric power disruption event, the microcontroller 22 recognizes it as an external trigger signal for the anytime setting. The microcontroller 22 reacts at the moment of receiving the trigger signal by promptly converting the lighting performance from a full-power illumination to a power-saving illumination and at the same time stores the selected time point information into its memory. The time point of the anytime setting serves as a new conversion time point for repetitive performance on a daily basis until another trigger signal or external control signal being received by the microcontroller.

Besides the aforementioned electric power disruption method, the anytime setting can also be done by operating an external control means, for instance, a toggle switch, which is connected between the ground and a pin of the microcontroller, not shown in FIG. 2. The anytime setting is triggered by the user at a desired conversion time point by momentarily short-circuiting the toggle switch, wherein a short-duration zero voltage appears at the pin of the microcontroller. At the moment when the user operates the toggle switch for the anytime setting by short-circuiting it and within a short time restoring it to open-circuit, the microcontroller 22 with program codes detects therefore at the pin connected with this toggle switch an instant zero voltage wherein the microcontroller 22 recognizes it as an external trigger signal for the anytime setting and reacts at the time point of receiving the trigger signal by promptly converting the lighting performance to a power-saving illumination and at the same time stores the selected time point information into its memory for repetitive performance on a 24-hours basis, as afore described.

The fixed time point setting is done by engaging an external control means connected to the microcontroller. Referring to FIG. 2, a toggle switch S23, for instance, serves as an external control means which is connected between one pin P2.0 of the microcontroller 22 and the ground. The fixed time point setting is selected by short-circuiting the switch S23, wherein a zero voltage appears at the pin P2.0. The microcontroller 22 with program codes scans constantly the electric potential at pins. If a zero voltage is detected at the pin P2.0, the microcontroller 22 interprets it as an external control signal for the fixed time point setting, wherein the microcontroller 22 runs a subroutine of the program codes to count a time delay $t_D$ for performing the full-power illumination, such that $$t_D = t_o + (T-12)/2,$$

where $t_o$ is a constant in the subroutine, representing one of time lengths selectable to the users as the basis for making seasonal shift adjustment, T is a mean value of night time lengths collected from measurement of at least three consecutive days with the help of photo sensor 3 and processed by the program codes of the microcontroller. The fixed time point setting is valid for repetitively performing the lifestyle mode on a daily basis until other setting method is done by engaging proper external control means.

The fixed time point setting enables the microcontroller with its program codes to counteract the seasonal time shift of dusk and dawn so as to dynamically adjust the time length of the preset time period for performing a full-power illumination. For instance, a three-hour time period is normally preset in the subroutine, for which the constant $t_o=3$. If in spring season with sunset at 6 p.m., then T=12 for the nighttime, the lighting device will be converted to a power-saving or security illumination at 9 p.m. which is a conversion time point without being affected by the seasonal time shift of dusk and dawn. With the fixed time point setting, if in summer season with sunset at 8 p.m., then T=8 for the nighttime, $t_D=3+(-2)=1$, the lighting device will be converted to a power-saving or security illumination at 8 p.m.+$t_D$=9 p.m.; if in winter season with sunset at 4 p.m., then T=16 for the nighttime, $t_D=3+(2)=5$, the lighting device will be converted to a power-saving or security illumination at 4 p.m.+$t_D$=9 p.m. Consequently, when the timer program of the microcontroller is configured to be compliant with seasonal time shift, the conversion time point is fixed despite the seasonal daytime variation. This fixed time point setting is different from the method used in the prior art U.S. Pat. No. 7,339,471 B1 where the duration of illumination is determined based on a predetermined fraction of the recorded length of nighttime from previous night and consequently the time point of conversion may change during different seasons.

The fixed time period setting is done by engaging external control means connected to the microcontroller. Referring to FIG. 2, two toggle switches S22 serves as external control means which are respectively connected to pins P2.1 and P2.2 of the microcontroller 22 and the ground, for respectively setting 6-hour (6H) and 3-hour (3H) time period. The fixed time period setting is selected by short-circuiting one switch, for instance, the switch 6H, wherein a zero voltage appears at the pin P2.1. The microcontroller 22 with program codes scans constantly the electric potential at pins. If a zero voltage is detected at the pin P2.1, the microcontroller 22 interprets it as an external control signal for the fixed time period setting, wherein the microcontroller 22 runs a subroutine of the program codes to count a time period of 6 hours, such that the full-power illumination continues 6 hours before the lighting device 1 being converted to a power-saving illumination. By analogy, if a zero voltage is detected at the pin P2.2 when the toggle switch 3H is short-circuited, the microcontroller 22 runs a 3-hour delay time subroutine to enable a full-power illumination for 3 hours. The fixed time period setting is valid for repetitively performing the lifestyle mode on a daily basis until other setting method is done by engaging proper external control unit.

Refer to FIG. 1 and FIG. 2. In FIG. 2, when the lighting device 10 operates in the lifestyle mode by open-circuiting the mode selection switch S21, the illumination of the lighting device 10 is divided by a conversion time point into two stages, with the first stage being a full-power illumination and the second stage being a power-saving illumination. To make the security light versatile, the lighting device 10 of the present disclosure furthermore provides four options for the second stage energy-saving illumination by modifying the microcontroller program codes to take account additional external control signals which will be described as follows.

The four options at the second stage illumination can be done by using two light source loads 6a, 6b of different power levels and incorporating with a motion sensor 4. For instance, the load 6a is a high-wattage light source and 6b is a low-wattage one. In FIG. 2, a motion sensor 4 is connected to the pin P1.3 of the microcontroller 22. In addition, two toggle switches S24, S25 serve as external control means to make four different illumination types selectable by generating control signals respectively sent to the pins P2.3 and P2.5 of the microcontroller 22. The external control means S24, S25 can be so designed, for instance, S24 controls the coupling between the microcontroller 22 and the motion sensor 4, and S25 controls the illumination level of the lighting device. As depicted in FIG. 2, when a toggle switch S24, S25 is closed or short-circuited, a zero voltage appears at the corresponding pin which can be recognized and interpreted by the microcontroller 22 as external control signal to execute a corresponding illumination type. By operating the external control means S24, S25 properly, the microcontroller generates with program codes, either reacting to or disabling the motion sensor 4, a zero or a VDD voltage at the pins P0.0 and P1.0 respectively to control the luminance of the two light source loads 6a, 6b. The luminance intensity of the lighting device 10 is controlled by the electric voltages at the pins P0.0 and P1.0, for instance: With zero voltage at both P0.0 and P1.0 is a darkness state (0); with zero voltage at P0.0 and VDD at P1.0 is a low level illumination (L); with VDD at both P0.0 and P1.0 is a high level or full-power illumination (H).

Referring FIG. 2, incorporating with the external control means S24, S25 and the motion sensor 4, the microcontroller 22 runs subroutines in response to the external control signals for the second stage power-saving illumination, which are:

(1) Complete cutoff (0), for instance, by opening both the switch S24 and S25, wherein the second stage illumination is darkness (0) by disabling the motion sensor 4 throughout the rest of nighttime;

(2) Low level illumination (L), for instance, by opening the switch S24 and by closing the switch S25, wherein the second stage is a low-level illumination and disabling the motion sensor 4 throughout the rest of nighttime;

(3) Single-level illumination coupled with motion sensor (H,0), for instance, by closing the switch S24 and by opening the switch S25, wherein the illumination is changed from darkness (0) to a high-intensity brightness (H) in response to the motion detection signal;

(4) Two-level illumination coupled with motion sensor (H,L), for instance, by closing both the switch S24 and S25, wherein the illumination is changed from a low (L)- to a high (H)-intensity luminance in response to the motion detection signal.

In view of FIG. 2, the light source loads 6a, 6b can be incandescent lamps, fluorescent lamps, AC LED modules or LED bulbs which are connected via relays 5a, 5b to an AC power. FIG. 2 depicts schematically a lifestyle lighting device 10 which performs two-level illumination based on a double-light source load structure comprising a low-wattage and a high-wattage light source load such that the high-wattage light source load 6a is activated by the motion sensor 4 and the low-wattage light source load 6b is automatically turned on and off by the photo sensor 3. In fact, there is no restriction imposed on the type and the number of the light source loads. The operation principle of a lifestyle lighting device according to FIG. 1 can be equally applied to a single light source load, driven either by DC power or AC power, wherein the lighting device performs a two-level illumination at the second stage by dimming technique which will be described as follows.

Figure 3:
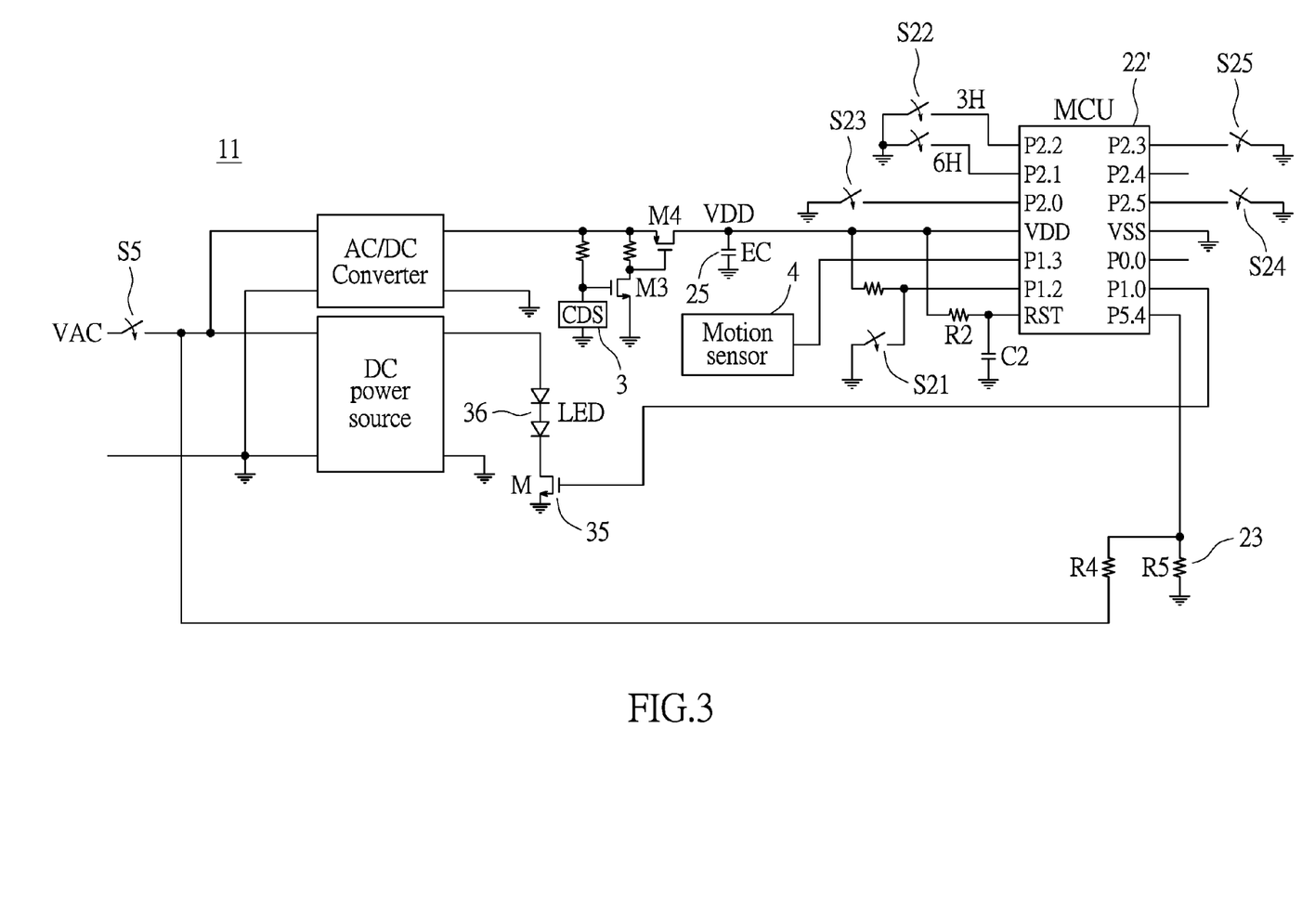
FIG. 3 schematically shows a circuit diagram depicting the lighting device to perform lifestyle lighting by controlling the conduction state of a unidirectional controllable switching unit according to an embodiment of the present invention.

Referring to FIG. 3, according to an embodiment of the present disclosure, the lighting device 11 is equipped with a light-emitting diode (LED) module 36 connected in series with a NMOS transistor M 35 and a DC power source. Comparing with the embodiment of the present disclosure depicted in FIG. 2, the LED module 36 is a single light source load and the transistor M 35 is a unidirectional controllable switching unit. Besides the difference in light source structure and driving power source, the lighting devices 11 adopts the same controller structure including a photo sensor 3 and a motion sensor 4 as shown in FIG. 2. In FIG. 3, the microcontroller 22' runs programs in response to the external control signals or trigger signals generated from the external control means S21-S25, 23,S5 in the same manner as described for the circuit diagram sketched in FIG. 2.

Refer to FIG. 3. By operating the control unit S21 to select the working mode, the lighting device 11 performs dusk-dawn mode and lifestyle mode, respectively, through the luminance control of the LED module 36. In the lifestyle mode the lighting device 11 performs the full-power illumination for a preset time period and is converted into the power-saving illumination at a conversion time point controlled by a delay timer in the microcontroller 22'. By operating the control means S22, S23, S5 properly, the delay timer of the microcontroller 22' is configured by one of the three setting methods, which are the anytime setting, the fixed time point setting and the fixed time period setting, in order to execute the corresponding delay time subroutines. Furthermore, by operating the external control means S24, S25 properly, the lighting device 11 performs the energy-saving or security illumination at the second stage to generate one of four different illumination types which are complete darkness, low-power illumination, motion sensor activated single-level and two-level illumination.

Figure 3A:
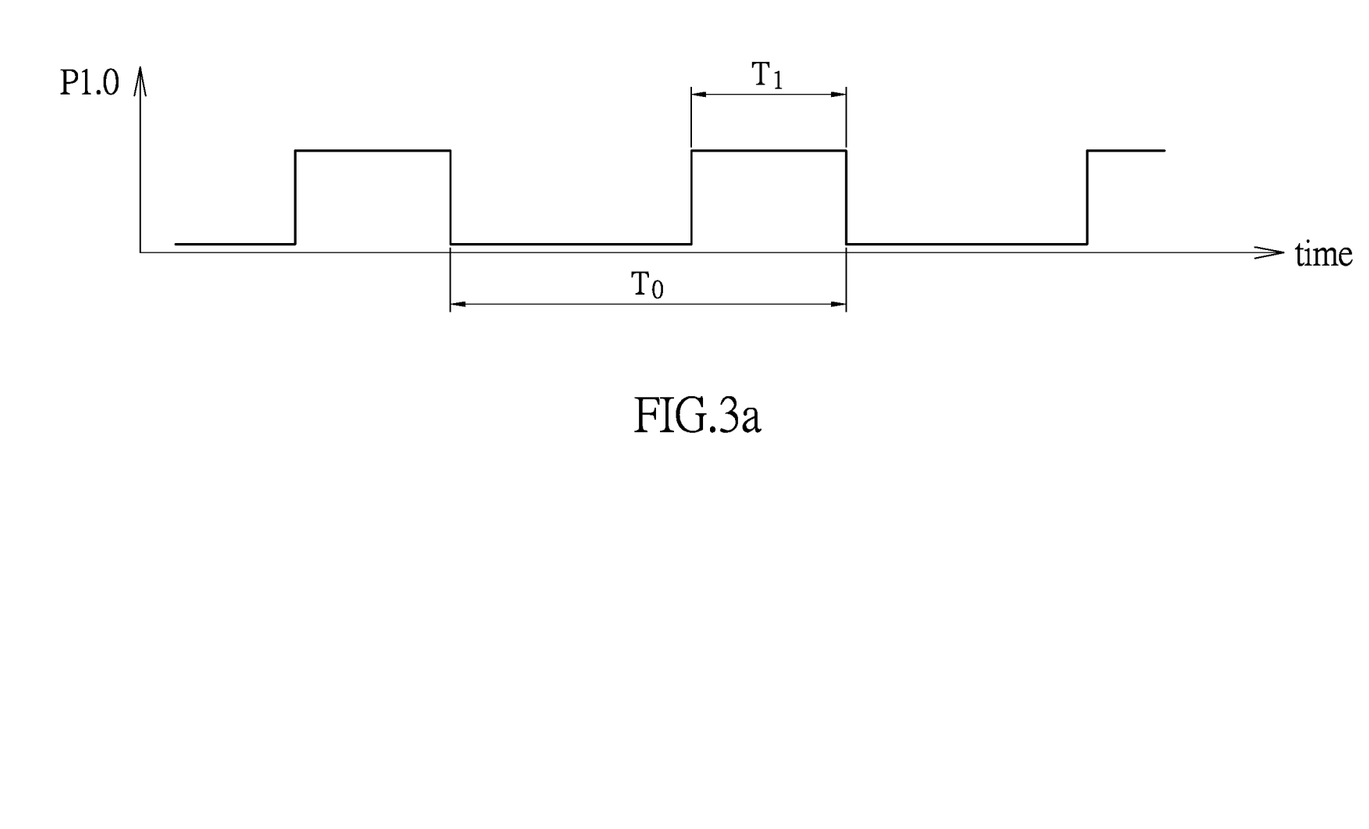
FIG. 3a schematically shows a PWM signal for controlling the conduction state of the unidirectional controllable switching unit in the circuit diagram of FIG. 3.

Referring to FIG. 3, the NMOS transistor M 35 has its drain connected to the LED module 36 and its gate connected with one pin P1.0 of the microcontroller 22'. The microcontroller generates with program codes in response to the external control signals a series of pulse-width-modulation (PWM) signals at the pin P1.0. FIG. 3a represents the waveform of a PWM signal which has a low voltage and a high voltage within the period $T_o$, wherein the high voltage is characterized by a time length $T_l$. The ratio of $T_l$ to $T_o$, namely, $T_l/T_o$, is referred to as the duty cycle of the PWM signal. The PWM signal generated at the pin P1.0 is fed to the control gate of the unidirectional control switch 35, wherein the transistor M 35 is turned on during the time $T_l$ by the high voltage such that the conduction rate of the transistor M 35 is controlled by the PWM signal. The duty cycle of the PWM signal determines an average electric power transmitting to the LED module 36.

Referring to FIG. 3, when the lighting device 11 is in lifestyle mode performing the second stage illumination, the motion sensor activated single-level illumination is performed by the microcontroller 22' with program codes in response to the motion sensor 4, wherein a PWM signal of the maximum duty cycle is generated at the pin P1.0 and sent to the transistor M 35 for controlling a maximum average electric power transmitting to the LED module 36 so as to perform full-power illumination, and then after a short time period a zero voltage is generated at the pin P1.0 to shut down the LED module 36; the motion sensor activated two-level illumination is performed by generating a PWM signal of the maximum duty cycle for the full-power illumination and then a PWM signal of small duty cycle for the low-power illumination.

Refer to FIG. 3 and FIG. 3a. In the lifestyle mode, when the lighting device 11 is activated by the motion sensor to perform single-level or two-level illuminations, the microcontroller 22' can be further controlled by an additional external control signal to enter a subroutine to continuously vary the duty cycle of the PWM signal, for instance by continuously varying the time length $T_l$ of the PWM signal in FIG. 3a, for controlling the controllable switching unit 35 to transmit a continuously varying average electric power to the light source load 36, such that during the varying process the luminance of the lighting device 11 increases slowly in intensity until a full-power illumination, what is referred to as soft on, and, after a short time interval, the luminance of the lighting device 11 decreases slowly in intensity to end the motion sensor activated cycle, what is referred to as soft off.

Figure 4:
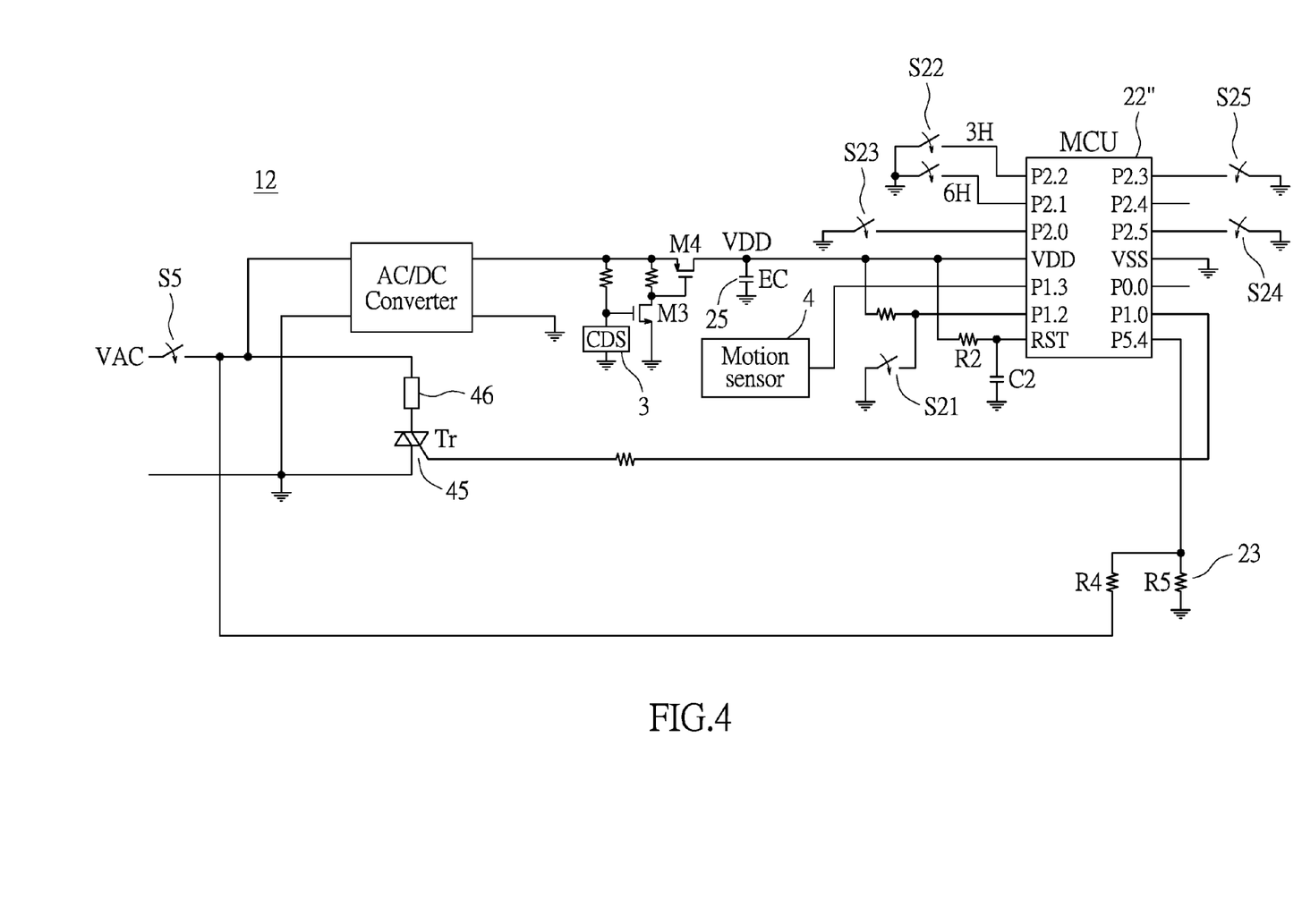
FIG. 4 schematically shows a circuit diagram depicting the lighting device to perform lifestyle lighting by controlling the conduction state of a bidirectional controllable switching unit according to an embodiment of the present invention.
Figure 4A:
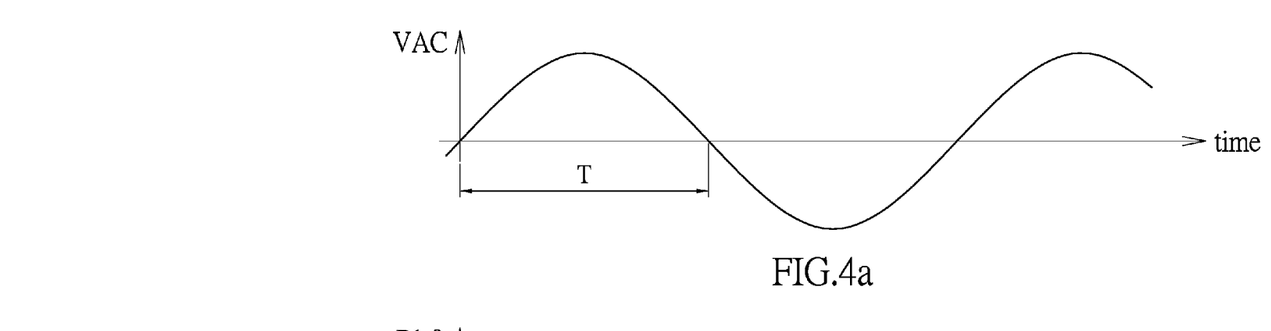
FIG. 4a, FIG. 4b and FIG. 4c schematically show voltage signals for controlling the conduction state of the bidirectional controllable switching unit and the AC electric power transmitting to a light source load in the circuit diagram of FIG. 4.

Refer to FIG. 4. According to an embodiment of the present disclosure, the lighting device 12 has a light source load 46 connected in series with a triac Tr 45 and an AC power. Comparing with the lighting device 11 as depicted in FIG. 3, the triac Tr 45 is a bidirectional controllable switching unit. The light source load 46 can be a halogen lamp, an incandescent lamp, a fluorescent lamp, an AC LED module or a LED bulb. Besides the difference in the controllable switching unit 45, the lighting device 12 adopts the same controller structure as shown in FIG. 2 and FIG. 3. In FIG. 4, the microcontroller 22" runs programs in response to the external control signals or trigger signals generated from the external control means S21-S25, 23, S5 in the same manner as described for the embodiments depicted in FIG. 2 and FIG. 3, wherein the lighting device 12 performs respectively dusk-dawn mode and lifestyle mode, depending on the external control signal generated from the control means S21.

Referring to FIG. 4, the microcontroller 22" has a pin P1.0 connected to a control gate of the bidirectional controllable switching unit 45 to control its conduction state for transmitting AC electric power to the light source load 46. The voltage divider 23, with its output connected to the pin P5.4 of the microcontroller 22", can serve both as the sampling circuit for the anytime setting and also as a zero-crossing-point detector. The anytime setting is done by operating the power switch S5 to generate a zero voltage for a time duration in second range at the pin P5.4, which is detected by the microcontroller 22 and interpreted as the anytime setting signal. As a zero-crossing-point detector the microcontroller 22" receives constantly at the pin P5.4 a zero-crossing signal in millisecond range synchronized with the AC power.

To elucidate the use of the zero-crossing-point detector and the principle of controlling the bidirectional controllable switching unit, in accompanying FIG. 4, FIG. 4a, FIG. 4b and FIG. 4c represent respectively the waveforms of (a) AC power signal, (b) the phase-angle control signal at the pin P1.0 and (c) the voltage signal across the two terminals of the light source load 46. Referring to the waveforms in FIG. 4a and FIG. 4b, the microcontroller 22" detects with the help of the zero-crossing-point detector 23 constantly at the pin P5.4 a zero-crossing signal, not shown here, in each half period T of the sinusoidal AC power, and generates with its program codes a square wave in FIG. 4b at the pin P1.0 which is synchronized with the AC power in FIG. 4a and serves as phase-angle control signal. The square wave in FIG. 4b has its front edge lagging behind the zero-crossing point of the AC power in FIG. 4a. Referring to the waveforms in FIG. 4b and FIG. 4c, the phase-angle control signal at P1.0 triggers at its front edge the triac 45 into conduction, wherein during the conductive period of the triac 45 a voltage signal of the duration $t_{on}$ appears at the two terminals of the light source load 46 such that an average electric AC power in proportion to the time duration $t_{on}$ is transmitted to the light source load 46.

Referring to FIG. 4, in conjunction with the zero-crossing-point detector 23, the microcontroller 22" generates in response to the external control signals different phase-angle control signals at the pin P1.0 with different time lags behind the zero-crossing point, so as to control different conductive phase angles of the triac Tr 45 to respectively transmit full power, small power and no power to the light source load 46, such that the lighting device 12 performs full-power illumination, low-power illumination and darkness, respectively.

Referring to FIG. 4, FIG. 4a, FIG. 4b and FIG. 4c, when the lighting device 12 performs single-level or two-level motion sensor activated illuminations, the microcontroller 22" can be further controlled by additional external control signal to enter a subroutine of the program codes to slowly change the conductive duration of the controllable switching unit 45. The microcontroller 22" with program codes generates phase-angle control signals in FIG. 4b with its front edge shifting continuously with time to continuously vary the conductive phase angle of the triac Tr 45, such that a continuously varying AC electric power, which results from a continuously varying conductive duration $t_{on}$ of the triac Tr 45, is transmitted to the light source load 46, wherein, during the varying process, the illumination of the lighting device 12 increases slowly in brightness till a full-power level (soft on) and after a short time interval decreases slowly in brightness to end the motion sensor activated cycle (soft off).

Figure 4B:
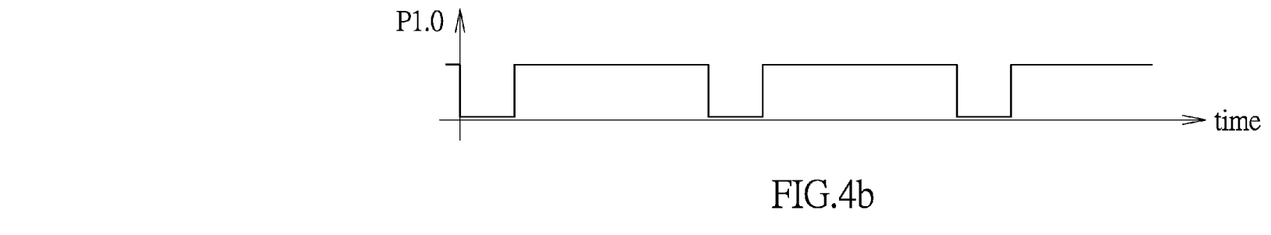
Figure 4C:
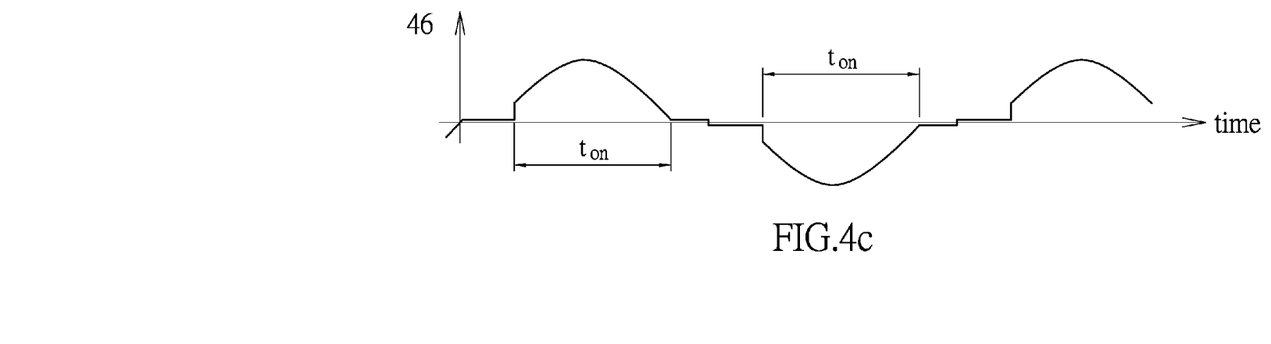

The use of PWM signal and phase-angle control signal, as depicted respectively in FIG. 3a and in FIG. 4b, to vary or to dim the luminance of light source load, offers many variations in controlling luminance level of the lifestyle lighting device, which can be done simply by modifying the program codes of the microcontroller without changing the circuit hardware as disclosed in embodiments depicted in FIGS. 3-4. When the lighting devices performs motion sensor activated two-level illumination, the luminance intensity of the low-power illumination can be further adjusted by using additional external control signal to control the microcontroller to run a corresponding subroutine.

The lighting device according to various embodiments of the present invention relies on the operation of external control means to generate external control signals. To facilitate the operation of the external control means, user-oriented construction of the external control means is required, wherein the external control means can be composed of push button, toggle switch, infrared sensor or similar means which generates constant voltage or binary signal with a low and a high voltage readable by the microcontroller and interpreted as the external control signal to execute a corresponding subprogram in the microcontroller. Furthermore, the binary signal can be a square waveform, for instance, with a small width for low voltage, referred to as short-zero control signal, or with a large width for low voltage, referred to as long-zero control signal. The use of binary signal in form of short-zero and long-zero can facilitate the selection of different working functions designed in the lighting device.

Figure 5:
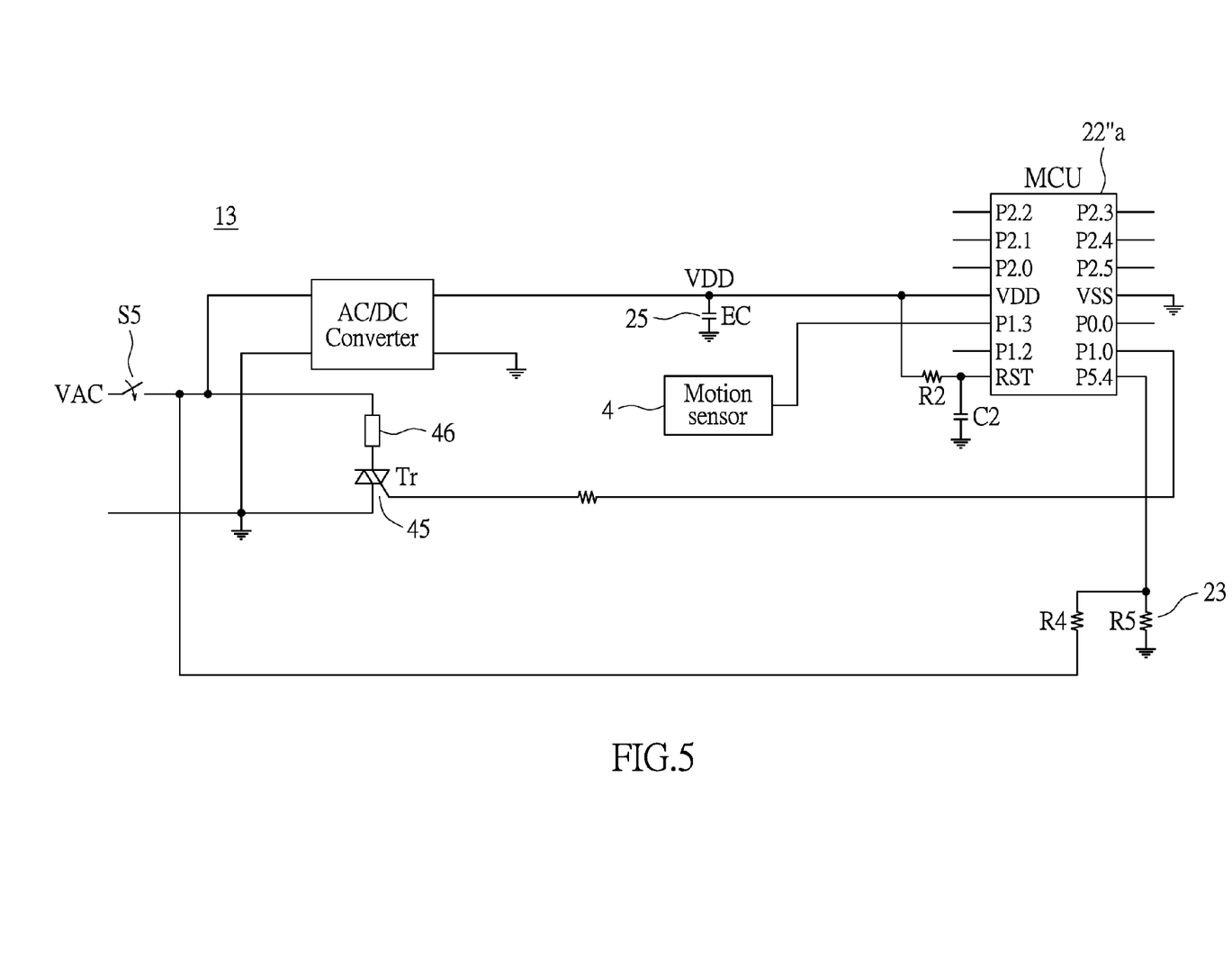
FIG. 5 schematically shows a circuit diagram depicting a variation in construction of a lighting device with lifestyle solution.

Based on the operation principle depicted in FIG. 1, there are many possibilities to implement lifestyle solution. In accompanying FIG. 4, FIG. 5 shows schematically a circuit diagram that is in fact a variation derived from FIG. 4, wherein the photo sensor CDS 3 and the external control means S21-S25 are removed, with the exception that the main power switch S5 is reserved for some technical applications. In FIG. 5, the luminance of the single light source load 46 is basically controlled by different conductive phase angles of the triac Tr 45 with method as described for the circuit diagram in FIG. 4. Comparing with the circuit of FIG. 4, the circuit depicted in FIG. 5 has some features deserved to be mentioned here. Referring to FIG. 5, the lighting device 13 can be so constructed that it has a microcontroller 22"a with program codes to control its illumination, for instance, to perform a general illumination mode and a lifestyle mode respectively by operating the power switch S5. The general lighting mode is related to a usual on/off operation of the switch S5, such that with the switch S5 being turned on, the lighting device 13 illuminates with full power; while with the switch S5 being turned off, the lighting device 13 shuts off completely. To be distinguishable from the general illumination mode, the lifestyle mode is selected, for instance, by momentary turning off and turning back on the switch S5 within a preset instant time period, such as 1-2 seconds. If the microcontroller 22"a with program codes detects this on-off-on operation sequence through the pin P5.4 connected to the voltage divider 23, the microcontroller 22"a runs a corresponding subroutine for performing the lifestyle mode, wherein the lighting device 13 performs a full-power illumination for a short time period, for instance, a period of five minutes, and then is converted to a single-level or a two-level illumination activated by the motion sensor 4. The simple circuit construction in FIG. 5 eliminates timer settings and various functional selections.

The lighting device 13, as depicted in FIG. 5, can be used for general illumination in house. It is even more favorable to design the lifestyle mode by combining the aforementioned soft on and soft off techniques to the single-level or two-level illumination activated by motion sensor. With such a lighting device 13, the house owner before sleeping can simply operate the wall switch S5 by on-off-on actions to select the lifestyle mode; the lighting device 13 illuminates with full power for a short time period and then enters a standby power-saving status to await the detection signal from the motion sensor 4. If the house owner wakes up sometimes in the middle of the night, the soft on illumination activated by the motion sensor 4, wherein, instead of a sudden glaring brightness, the luminance intensity of the lighting device increases gradually, can make him feeling comfortable as he moves through a dark space. The lighting device is automatically turned off softly or switched gradually to a low level illumination after the house owner goes back to sleep. The circuit sketched in FIG. 5 provides therefore a simple and practical lifestyle solution without the use of photo sensor.

To make the lighting device of the present invention even more user friendly, additional lifestyle solution is provided for different time or on different occasions. A preferable solution is for example to build a multi-mode lighting device to perform two or three working modes merging into one single lighting device based on microcontroller technology, wherein the user can select one of the multi-modes for performance by using an external control signal to alternately change the working mode or using external control signals of different binary patterns to activate corresponding working modes. The multi-modes always includes a basic general illumination mode (with or without photo sensor) coupled with the above mentioned lifestyle security modes for user's selection.

To extend the lifestyle solutions based on the circuit diagram depicted in FIG. 5, in which the lighting device 13 consists of a motion sensor 4, a microcontroller 22"a and a plurality of external control means not shown in FIG. 5, the program codes of the microcontroller 22"a can be further modified to realize the automatic on/off function of the photo sensor such that the lighting device 13 is automatically turned on at dusk and turned off at dawn by the program codes of the microcontroller 22"a, wherein during the course of nighttime the lighting device 13 has at least two working modes selectable by the users. In order to perform the aforementioned lifestyle mode without using photo sensor, an initial setting process is taken by the users to input at least three time parameters, namely a first preset time point to turn on the lighting device for a full-power illumination, a second preset time point to convert to a power-saving/security illumination which is activated by the motion sensor and a third preset time point to turn off the lighting device and at the same time to reset the microcontroller for the next 24-hour performance cycle. The users based on their living habits operate corresponding external control means to generate at least three triggering signals to the microcontroller respectively at three time points representing the time to turn on for a full-power illumination, the time to convert to a power-saving illumination and the time to turn off the lighting device. Upon receiving the three triggering signals generated by the users, the microcontroller with program codes is able to store the time point information and thereby establish the working procedures to perform the lifestyle illumination mode on a 24-hour repetitive basis until new triggering signals are given by the user to change the time point parameters to establish a new lifestyle illumination mode. Such lifestyle mode without reliance on a photo sensor enables the users to manage their time table of lighting performance for both indoor and outdoor applications in a more flexible, more friendly and more energy saving ways.

The automatic on/off lighting device control based on the program codes of the microcontroller also helps to improve home security from the perspective of antitheft consideration. When the home owners are away for business trip or vacation for a longer period of time, say a week, if the houses are always dark or lit during the night time, for instance, the lighting device is automatically turned on and turned off by a photo sensor, it gives the intruder or thief a strong signal that the owners are out for a long trip and it is a good time to break in. On the contrary, the use of microcontroller to replace photo sensor for lighting control offers great flexibility to program a dynamically timed illumination, for instance, by adding an instant drop of illumination followed by a shorter time period of full-power illumination, say 1 to 10 minutes, till the second preset time point of conversion at which the lighting device being switched to a power-saving illumination. The temporary drop of illumination for a couple seconds serves as remind signal telling the users it is time to rest and the short extension of full illumination simply gives the user ample time to wrap up for sleeping. If the user wants to manage the third preset time point precisely according to his or her living need, the above initial setting process for inputting three preset time points is needed. However from a practical consideration and given the fact that human being living habit is used to 6-8 hours sleep it may just be good enough to build into the program codes with an eight hours time delay to perform the energy saving/security mode on an automatic basis. Thus, after 8 hours from the second preset time point for conversion of power-saving illumination, or alternatively 12 hours from the power on time point, the microcontroller with program codes will turn off the light and reset for the next operating cycle.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A lighting device for night illumination comprising:
at least a controllable switching unit, electrically connectable between at least a lighting load and a power source;
a photo sensor, for automatically enabling the performance of the lighting device at night fall and disabling the performance of the lighting device at daybreak;
at least one external control means, generating external control signals for selecting and setting the performance functions of the lighting load(s); and
a microcontroller, electrically connected to the controllable switching unit(s) and the external control means, wherein the microcontroller controls the conduction state of the controllable switching unit(s) to transmit electric power to the lighting load(s);
wherein the microcontroller with program codes operates in response to an external control signal from the external control means to perform a lifestyle lighting management wherein the lighting device is automatically turned on at dusk by the photo sensor to perform a high power illumination mode with an illumination level of the lighting load(s) being a first high power level for a time delay $t_D$ counted by a timer embedded in the microcontroller, and upon the timer ending count the lighting device is converted to perform a power saving mode, wherein the power saving mode is an arrangement to control the lighting load(s) in a completely turned off state, or an arrangement to control the illumination level of the lighting load(s) being reduced to a low level, wherein the power saving mode is performed until daybreak when the lighting device is turned off by the photo sensor, and the microcontroller is reset for the next operating cycle.

2. The lighting device according to claim 1, wherein in the power saving mode the illumination level of the low level is further adjustable by the external control means.

3. The lighting device according to claim 1, wherein in the high power illumination mode the illumination level of the first high power level is further adjustable by the external control means.

4. The lighting device according to claim 1, wherein a motion sensor is further installed to connect to the microcontroller to perform the power saving mode, wherein at dusk the lighting load(s) is turned on by the photo sensor to perform the high power illumination mode with the motion sensor being turned off, the high power illumination mode continues for the time delay $t_D$ before the lighting load(s) is converted to the power saving mode, wherein the lighting load(s) is switched either to a turned off state or to a low level illumination state with the motion sensor being activated to detect any motion intrusion, wherein whenever a motion is detected by the motion sensor, the microcontroller immediately and responsively manages to cause the lighting load(s) to resume the performance of a high power illumination with an illumination level of the lighting load(s) being a second high power level for a short time delay before returning back to the turned off state or low level illumination state in the absence of any succeeding motion intrusion(s).

5. The lighting device according to claim 4, wherein in the power saving mode the illumination level of the second high power level is further adjustable by the external control means.

6. The lighting device according to claim 1, wherein the controllable switching unit is at least one bidirectional control switch and the power source is an AC power source, the microcontroller controls in conjunction with a zero-crossing-point detector different conductive phase angles of the bidirectional control switch(s) to respectively transmit different AC electric powers to the lighting load(s) in response to external control signals from the external control means to perform the lifestyle lighting management.

7. The lighting device according to claim 6, wherein the lighting load(s) is an AC light emitting diode module or a DC light emitting diode module comprising at least one light emitting diode bridging one port of a full-wave bride rectifier.

8. The lighting device according to claim 6, wherein the lighting load(s) is a screwed-in light bulb connectable to the AC power source.

9. The lighting device according to claim 1, wherein in the lifestyle lighting management the timer is an anytime setting subroutine enabling the user to convert the lighting load(s) from the high power illumination mode to the power saving mode at any time point selected by the user during the night time period by operating the external control means to deliver the external signal to the microcontroller, wherein the microcontroller recognizes the external control signal and accordingly manages to promptly convert the lighting device from the high power illumination mode to the power saving mode and at the same time stores the selected time point in its memory for repetitive performance at the selected time point on a daily basis until another external control signal is produced by the external control means and is received by the microcontroller for changing the selected time point, wherein at dusk the lighting load(s) is turned on automatically by the photo sensor to perform the high power illumination mode until reaching the selected time point to convert to the power saving mode and at dawn the lighting load(s) is turned off with the microcontroller being reset for the next operating cycle.

10. The lighting device according to claim 9, wherein for the anytime setting a power switch connectable in series with the lighting device and the power source is instantly switched off and back to on for creating an instant disruption of power supply with a duration of power disruption being shorter than a preset time interval; and the microcontroller with program codes detects the instant disruption of power supply and interprets the instant disruption of power supply as the external control signal for activating the timer of the anytime setting subroutine installed in the program codes of the microcontroller.

11. The lighting device according to claim 1, wherein in the lifestyle lighting management the timer is a fixed time point setting subroutine, wherein the timer is programmed to be capable of tracing the night time/day time shift due to seasonal effect, wherein the timer embedded in the microcontroller dynamically adjusts the time delay $t_D$ of the high power illumination mode synchronous to the seasonal shift so that the lighting device can be converted from the high power illumination mode to the power saving mode at one of selectable fixed time points selected by the user by operating the relevant external control means to deliver the external control signal to the microcontroller according to the user's living habit, wherein the time delay $t_D$ for performing and continuing the high power illumination mode is dynamically adjusted according to the following formula:

$$t_D = t_o + (T-12)/2$$

wherein $t_o$ is a fixed length of time delay selected by the user for performing a fixed time point to convert the lighting device from the high power illumination mode to the power saving mode during the seasons when the time length of night time is equal to the time length of day time, T is a moving average of time lengths of night time measured by the on/off performance of the photo sensor between nightfall and daybreak;
wherein the microcontroller accordingly uses the season adjusted value of $t_D$ to dynamically control the length of delay time for performing the high power illumination mode until being converted to the power saving mode at a fixed time point.

12. The lighting device according to claim 1, wherein in the lifestyle lighting management the timer is a fixed time period setting subroutine, selected by the user by operating the external control means to deliver the external control signal to the microcontroller, wherein the length of the fixed time period or the duration for performing the high power illumination mode is counted from the time point of nightfall when the photo sensor operates to turn on the lighting device until the time point when the lighting device is converted to the power saving mode.

13. The lighting device according to claim 11, wherein the external control means comprises switches connected to different pins of the microcontroller for generating a constant voltage signal by short-circuiting the relevant switch which is interpreted by the program codes of the microcontroller as the external control signal for executing the subroutine of the fixed time point setting, wherein the time delay $t_D$ is dynamically adjusted according to seasonal shift of night length.

14. The lighting device according to claim 12, wherein the external control means comprises switches connected to different pins of the microcontroller for generating a constant voltage signal by short-circuiting the relevant switch which serves as the external control signal to configure the fixed time period setting, wherein the lifestyle timer of the microcontroller is set to run a constant time count of time delay $t_D$ by short-circuiting the relevant switch selected.

15. The lighting device according to claim 1, wherein the external control means comprises a wireless control device, electrically coupled to a pin of said microcontroller, wherein the wireless control device receives control signal through wireless communication and generates trigger signal for enabling or disenabling the timer's selection.

16. The lighting device according to claim 15, wherein the wireless control device is a Wi-Fi wireless control signal receiver, a Blue Tooth wireless control signal receiver or a RF (Radio Frequency) wireless control signal receiver.

17. The lighting device according to claim 1, wherein said microcontroller comprises a memory for saving or installing an application program (APP) or a software program, wherein the application program (APP) from an internet or a cloud server is downloaded for updating the memory of said microcontroller.

18. A method of lighting control, providing a timer for managing night illumination of a lighting apparatus, wherein the lighting apparatus includes at least a controllable switching unit connectable respectively to at least a lighting load, a photo sensor, at least an external control means and a microcontroller with program codes, the method comprising:
the photo sensor to automatically turn on the lighting load(s) at dusk and turn off the lighting load(s) at dawn;
the external control means to generate an external control signal to the microcontroller for selecting and operating the timer for performing a lifestyle lighting management;
the microcontroller with program codes to receive the external control signal generated by the external control means operated by an user to execute the subroutine of the timer to convert the performance status of the lighting load(s) from a high power illumination mode to a power saving mode at a time point selected by the user or after a time duration selected by the user counting from the time point of nightfall when the photo sensor activates the performance of the high power illumination mode, wherein the microcontroller further controls the conduction states of the controllable switching unit to transmit different powers to the lighting load(s) for performing different illumination modes.

19. The method of lighting control according to claim 18, wherein the timer is an any time point setting subroutine, wherein the user is able to select any time point during the night time period to operate the external control means to generate and deliver the external control signal to the microcontroller to immediately convert the performance of the lighting load(s) from the high power illumination mode to the power saving mode and at the same time to store the selected time point in its memory for repetitive performance at the selected time point on an daily basis.

20. The method of lighting control according to claim 18, wherein the timer is a fixed time point setting subroutine programmed to be capable of tracing the night time/day time shift due to seasonal effect, wherein the timer embedded in the microcontroller dynamically adjusts the duration of high power illumination mode synchronous to seasonal night time/day time shift so that lighting load(s) can be converted from the high power illumination mode to the power saving mode at one of the selectable time points according to the user's living habit, wherein the time delay $t_D$ for continuing the performance of the high power illumination mode is dynamically adjusted according to the following formula:

$$t_D = t_o + (T-12)/2$$

wherein $t_o$ is a preset time length corresponding to a time delay without seasonal adjustment and T is a moving average of time lengths of night time measured by the on/off performance of the photo sensor between dusk and dawn.

21. The method of lighting control according to claim 18, wherein the timer is a fixed time period setting subroutine, wherein the timer performs a fixed length of time delay, selected by the user by operating the external control means to deliver the external control signal, counting from the time point of nightfall when the photo sensor activates to turn on the lighting load(s) for performing the high power illumination mode until the time point when the lighting load(s) is converted to the power saving mode.

22. The method of lighting control according to claim 18, wherein the power saving mode is an arrangement wherein the lighting load(s) is in a complete cutoff state, or an arrangement wherein the illumination level of the lighting load(s) is switched to a low level, or an arrangement wherein a motion sensor is further installed to connect to the microcontroller, wherein the lighting load(s) is either in a cutoff state or is switched to a low illumination level while no motion intrusion is detected and whenever a motion intrusion is detected the microcontroller manages to instantly cause the lighting load(s) to resume the performance of a high power illumination for a short delay period before returning back to the cutoff or low level illumination state.

23. The method of lighting control according to claim 18, wherein the illumination level of the high power illumination is further adjustable by the external control means.

24. The method of lighting control according to claim 22, wherein in the power saving mode the illumination level of the low level illumination is further adjustable by the external control means.

* * * * *

UNITED STATES PATENT AND TRADEMARK OFFICE
CERTIFICATE OF CORRECTION

PATENT NO. : 9,480,129 B2  
APPLICATION NO. : 15/131448  
DATED : October 25, 2016  
INVENTOR(S) : Chia-Teh Chen Page 1 of 1

It is certified that error appears in the above-identified patent and that said Letters Patent is hereby corrected as shown below:

Item (63) should read:
(63)     Continuation of application No. 13/974,445 filled on Aug. 23, 2013, now Pat. No. 9,351,373

Signed and Sealed this  
Sixth Day of June, 2017

Michelle K. Lee  
*Director of the United States Patent and Trademark Office*